Sept. 21, 1926.

J. WILLIAMSON

LIGHTING FIXTURE

Filed July 31, 1924

1,600,659

Inventor:
James Williamson
By: Wm O. Bell
Atty.

Patented Sept. 21, 1926.

1,600,659

UNITED STATES PATENT OFFICE.

JAMES WILLIAMSON, OF CHICAGO, ILLINOIS.

LIGHTING FIXTURE.

Application filed July 31, 1924. Serial No. 729,292.

This invention relates to electric lighting fixtures and its object is broadly to provide a fixture of simple construction which can be easily installed in place on a ceiling or on a wall and adjusted in proper relation thereto so that the fixture will hang squarely even though the wiring may be carelessly installed.

Another object of the invention is to provide the fixture with a two-piece canopy in which the cap is adapted to be easily detached from the base, and with means for relieving the cap of the weight of the pendant part of the fixture.

My invention may be embodied in different types of lighting fixtures having drop cord or chain pendants and I have selected one embodiment of a drop cord lighting fixture to illustrate the invention in the accompanying drawings, in which—

Figure 1:
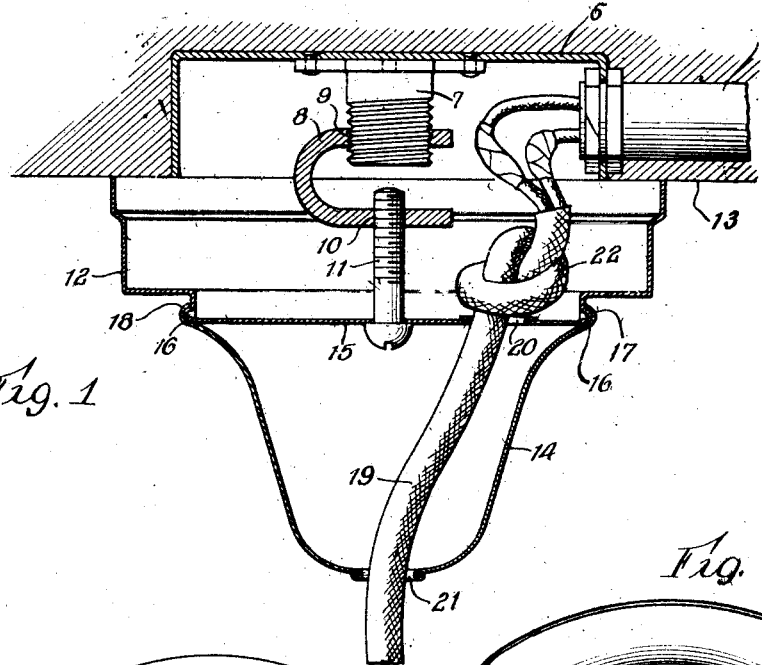
Fig. 1 is a sectional elevation showing the invention embodied in a ceiling fixture.
Figure 3:
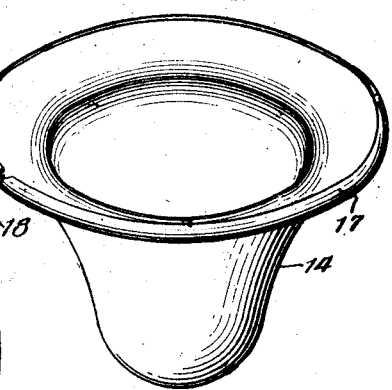
Fig. 3 is a perspective view of a cap.
Figure 2:
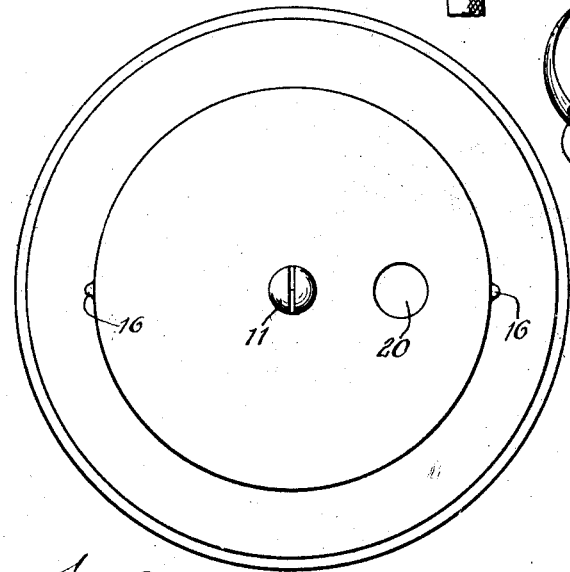
Fig. 2 is a bottom plan view of the base.

Referring to the drawings, 5 designates a wiring conduit and 6 a junction box having an externally threaded stud 7. An adapter in the form of a yoke 8 has one arm provided with a threaded opening 9 to receive the stud and its other arm provided with a threaded opening 10 to receive the bolt 11. The canopy comprises a base 12 adapted to be clamped against the ceiling 13 by the bolt 11, and a cap 14 detachably engaged with the base. The head of the bolt 11 engages the bottom plate 15 of the base and can be adjusted to clamp the base tightly against the ceiling or wall. The base is provided with projections 16 and the cap has a flange 17 provided with one or more notches 18 to enable the cap to be detachably engaged with the base. The conductor cord 19 passes from the conduit through an opening 20 in the bottom and an opening 21 in the apex of the cap, and this cord is preferably knotted at 22 to rest upon the bottom 15 of the base so that the weight of the cord pendant will be carried by the base and not by the cap.

The invention comprises only a few parts and these are of simple construction and can be made at comparatively low cost and easily and quickly installed without especial skill or training. The invention can be embodied with any sort of wiring installation which provides a stud of any kind to be threadedly engaged by the adapter yoke. It can be engaged to an externally threaded crowfoot but I have not considered it necessary to illustrate the crowfoot because it is now being discarded and the installation illustrated is one most generally employed. However, a flexible tubing may be substituted for the conduit 5 and any other changes in the wiring installation may be made as desired. The yoke is an adapter because it can be adjusted to any desired position about the stud and the connecting bolt and it can be bent to accommodate these parts in any angular relation they may bear to each other. The yoke is made of sufficient strength to hold the fixture rigidly in fixed position but at the same time the arms can be spread apart or bent closer to each other as may be required to adjust the fixture relative to the supporting member so that the fixture always may be installed squarely to the ceiling or wall.

I am aware that changes in the form, construction and arrangement of parts of my invention may be made without departing from the spirit or sacrificing the advantages thereof and I reserve the right to make all such changes as fairly fall within the scope of the following claims. For example, instead of the drop cord pendant I may provide the fixture with a chain pendant in a manner familiar in the art.

I claim:

1. The combination with a supporting member of an electric wiring installation, of a lighting fixture comprising a multipart canopy comprising a base part provided with a bottom plate and a cover part detachably engaged with said base, an adapter engaged with said supporting member, and a bolt engaged with said adapter and having its head engaged with said bottom plate whereby the base may be adjusted with relation to the supporting member and clamped in fixed position.

2. The combination with a supporting member of an electric wiring installation, of a lighting fixture canopy having a base provided with a bottom, an adapter yoke having one arm threadedly engaged with said member, a bolt engaged with said bottom member and threadedly engaged with the other arm of the yoke whereby the canopy can be adjusted relative to said member and clamped in fixed position, and a cap detachably secured to the base over the bottom thereof.

3. A lighting fixture, comprising a canopy with a base, and a cap secured to and covering the bottom plate of said base, bendable means within and supporting the canopy with adjustable means connecting the said base and bendable means, said base having an opening for the passage of the conductor member and a bolt in said base and covered by said cap.

JAMES WILLIAMSON.